March 23, 1954 K. W. JAY ET AL 2,672,881
PRESSURE REGULATING VALVE
Filed Dec. 18, 1950 2 Sheets-Sheet 1

INVENTORS
K. W. JAY
R. B. FERRIS
PER

ATTORNEY.

March 23, 1954  K. W. JAY ET AL  2,672,881
PRESSURE REGULATING VALVE
Filed Dec. 18, 1950  2 Sheets-Sheet 2
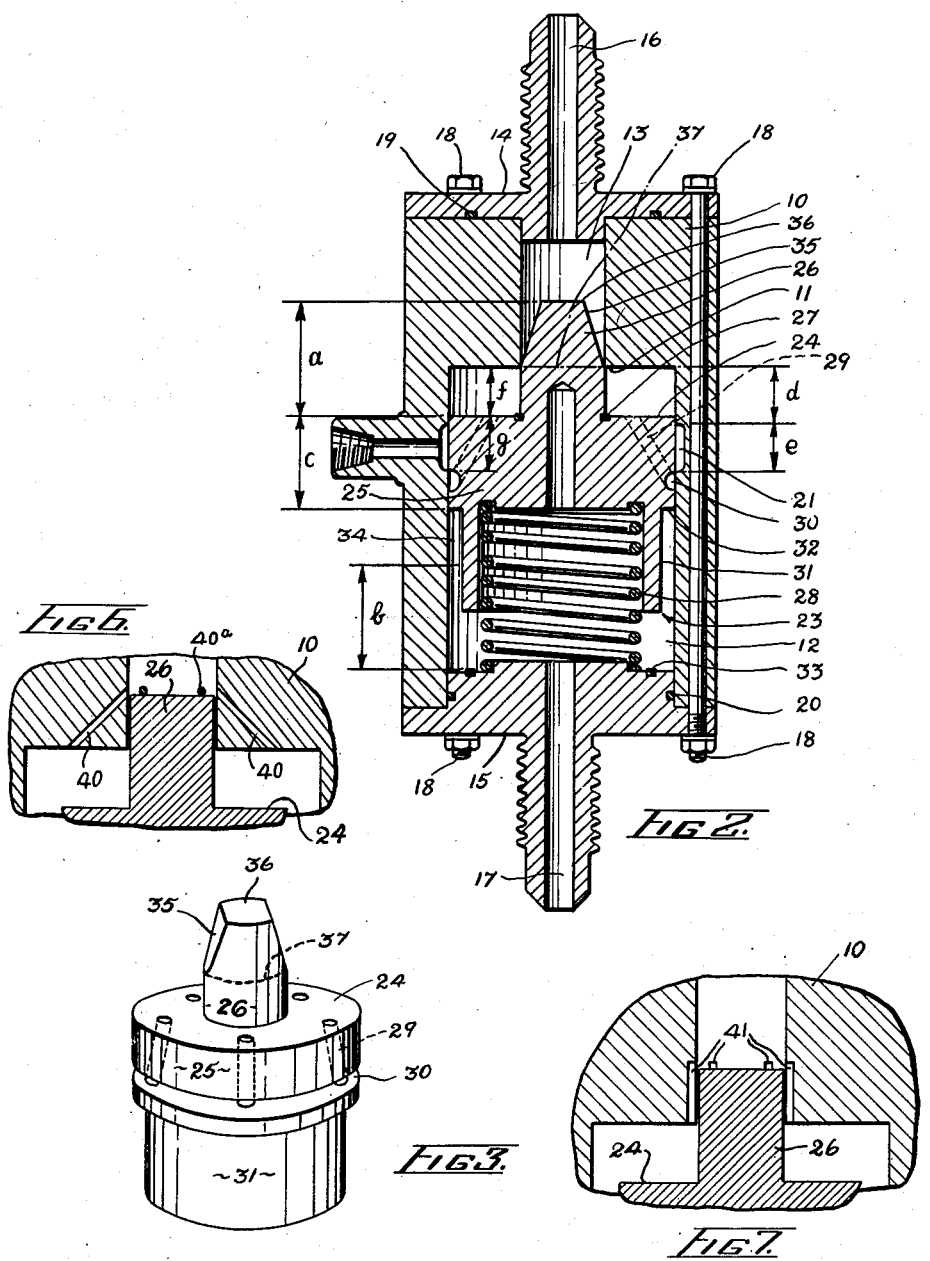
INVENTORS
K.W. JAY
R.B. FERRIS
PER
ATTORNEY Patented Mar. 23, 1954

2,672,881

UNITED STATES PATENT OFFICE 2,672,881

PRESSURE REGULATING VALVE

Kenneth William Jay, Weston, Ontario, and Roland Boyd Ferris, Toronto, Ontario, Canada, assignors to A. V. Roe Canada Limited, Malton, Ontario, Canada, a corporation Application December 18, 1950, Serial No. 201,266

8 Claims. (Cl. 137—470)

This invention relates to pressure regulating valves as employed in fluid flow systems and more particularly to that class of such valves whose action is fully automatic.

In some circumstances a pressure regulating valve is required to admit fluid to a system at a predetermined pressure, such admission to take place rapidly to substantially full flow condition, and to cut off the flow, equally rapidly, at another predetermined pressure. One simple method of accomplishing this end has been to construct the valve as a piston which slides inside a cylinder against the action of a spring, the piston being stepped so that its full cross-sectional area is exposed to the actuating pressure in successive stages.

In the past, however, valves constructed in this manner have suffered from the fault that the smaller portion of the piston has to be withdrawn completely from its cylinder before the remaining portion of the piston becomes operative. Since the piston is liable to rotate when it is in the fully open position due to vibration of the valve, any slight inaccuracy or eccentricity in the smaller portion, or any misalignment of the piston in its open position, will cause jamming or sticking so that the functioning of the valve is impaired.

Furthermore the rapidity of operation of existing valves of this type is affected by the necessary provision of means to avoid the trapping of fluid in the larger working cylinder as the valve closes; this difficulty is usually overcome by arranging that the space above the larger portion of the piston is open to an outlet at all times, so that, as the valve opens, the entire system to which the valve discharges must be filled before the snap opening to full flow conditions can take place.

It is the object of this invention to provide the means whereby such an automatic pressure regulating valve will operate without the risk of sticking or jamming during the closing operation.

It is a further object to provide the means, in such a valve, whereby fluid trapped in the cylinder as the piston closes may be drained off without reducing the rapidity of the valve's action.

Further objects and advantages will become apparent during the course of the following description.

In the accompanying drawings which form a part of this specification and in which like reference characters designate like parts throughout the same:

Figs. 4, 5, 6 and 7 are fragmentary views of alternate arrangements of the flow channels associated with the small or stepped portion of the piston assembly.

Figure 1:
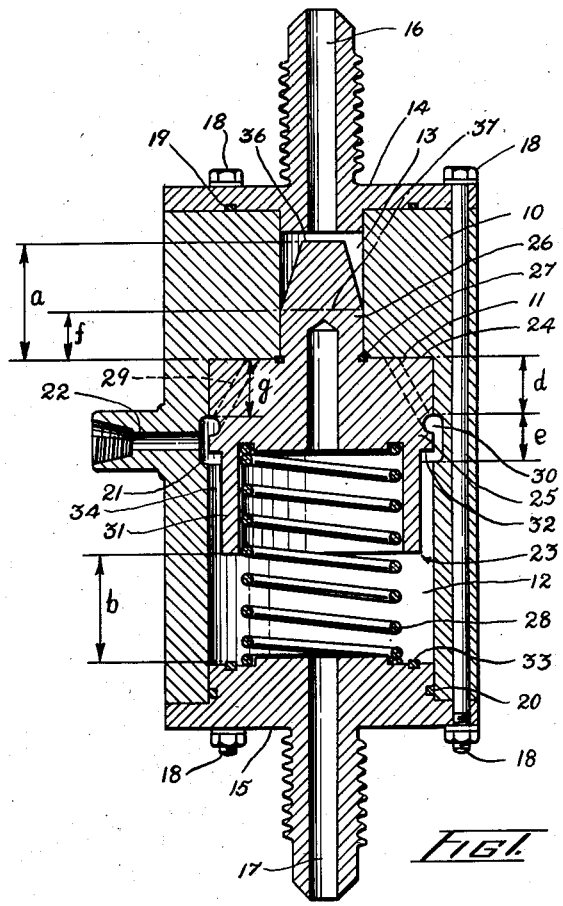
Fig. 1 is a sectional view taken through the longitudinal axis of a regulating valve constructed according to the invention and showing the valve in the fully closed position.

The valve illustrated has a cylindrical casing 10 containing a chamber which constitutes the working cylinder of the valve and which has an annular shoulder 11 to provide a main chamber or large cylinder 12 and a restricted chamber or small inlet cylinder 13 coaxial with the large cylinder. The ends of the casing are closed by plates 14 and 15 which are provided with an inlet port 16 and a drain port 17 respectively; the end plates are attached to the casing by means of bolts 18 and are sealed against leakage by the O-rings 19 and 20 respectively. A circumferential outlet groove 21 is provided in the cylindrical wall of the large cylinder 12 and it leads to an outlet port 22 in the casing 10.

A piston assembly 23 is slidably mounted in the working cylinder, the piston assembly having an annular step or shoulder 24 to provide a large main piston 25 of a diameter corresponding to the large cylinder 12 and a turned down portion or small pilot piston 26 coaxial with the large piston and of reduced cross-sectional area corresponding to the small cylinder 13. An O-ring 27 is situated in a recess around the base of the pilot piston 26, on the annular shoulder 24 and registers with the shoulder 11 at the line of intersection of the casing shoulder 11 with the inlet cylinder 13 when the piston assembly is in the closed position. A compression spring 28 is situated between the piston assembly 23 and the end plate 15 and holds the piston in the closed position when the fluid pressure at the inlet 16 is below a predetermined value.

Oblique conduits 29 extend through the body of the main piston 25 from the shoulder 24 to circumferential openings on the surface of the main piston, and the openings are preferably connected by a circumferential piston groove 30 in the side of the main piston to provide a common outlet for the oblique passages 29. A skirt 31 extends coaxially from the base 32 of the main piston and registers, when the piston assembly is in the fully open position, with an O-ring 33 mounted in the end plate 15. The outer diameter of the skirt is materially less than the diameter of the main cylinder 12, providing an annular drainage space 34 between the two components.

Figure 3:
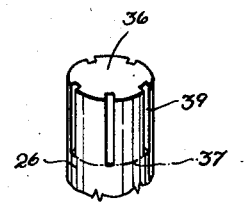
Fig. 3 is an enlarged view of the piston assembly of the valve.

Fig. 3 shows a preferred form of the small pilot piston 26. Inclined flat planes 35 are machined on opposite sides of the piston, each extending from the crown 36 of the pilot piston to points situated on a hypothetical circumferential line encircling the piston and represented in the drawings as a phantom line 37, whereby channels or passages between the circumferential surface of the pilot piston 26 and that of the inlet cylinder 13 will be provided, without interfering with the close sliding fit of the pilot piston, when it is partially withdrawn from the said cylinder. An alternative arrangement as illustrated in Fig. 4 may be employed to provide flow channels by-passing a portion of the pilot piston; in this arrangement the planes 35 are replaced by a series of oblique passages 38 extending from the crown of the pilot piston 26 to the aforesaid hypothetical line 37. In a further alternative arrangement, as shown in Fig. 5, a series of longitudinal slots 39 is substituted for the apertures 38, the slots providing flow channels or passages when the pilot piston is partially withdrawn from its cylinder. In any of these arrangements, the flow channels provided in the pilot piston, if projected on the axis of the piston in the closed position, will be colinear with a portion of the said piston lying between the hypothetical line 37 and the crown 36; this portion may be referred to as the aligning portion, and the remainder of the pilot piston adjoining the main or large piston 25 may be referred to as the base portion.

Other alternative arrangements providing flow channels by-passing the aligning portion of the pilot piston when the base portion is fully withdrawn from the inlet cylinder are illustrated in Figs. 6 and 7. As shown in Fig. 6, oblique flow passages 40 may be provided in the casing 10, the passages extending from circumferentially spaced by-pass inlet openings 40ª in the wall of the inlet cylinder 13 to by-pass outlet openings in the casing shoulder 11. The by-pass inlet openings 40ª will be spaced from the casing shoulder 11 by a distance equal to the distance from the crown 36 to the hypothetical line 37 marking the dividing line between the base and aligning portions of the piston. Alternatively, a series of longitudinal slots 41 as shown in Fig. 7 may be provided in the wall of the inlet cylinder 13 in an arrangement similar to the provision of slots 39 in the pilot piston as shown in Fig. 5; the length of the slots 41 will be that of the aligning portion of the pilot piston. Whether flow passages are provided in the pilot piston or in the casing, the juncture of the base and aligning portions of the piston represented by the hypothetical line 37 will be in the plane of the casing shoulder 11 when the base portion of the pilot piston is fully withdrawn from the inlet cylinder.

Figure 2:
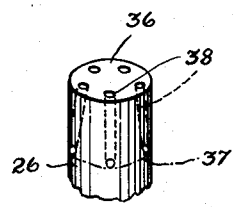
Fig. 2 is a sectional view similar to Fig. 1 but showing the valve in a partly open position.

In the preferred construction of the valve as illustrated in the drawings there are certain important relationships between the significant dimensions, and these dimensions are indicated in the drawings by lower case letters $a, b, c$, etc. The total length $a$ of the pilot piston 26, from its crown or tip to the O-ring 27, must be greater than the distance $b$ from the O-ring 33 in the plate 15 to the nearer extremity of the skirt 31 when it is in the closed position. Consequently, when the valve is fully open, and the skirt 31 is against the O-ring 33, the pilot piston will not be fully withdrawn from the small cylinder 13, although fluid will be allowed to flow through the channels provided by the inclined planes 35 (or alternatively through the passages 38 or 40 or the channels provided by the slots 39 or 41); therefore the small piston cannot fail to enter the small cylinder on the closing of the valve. In order that access to the drain port 17 may be provided, the total length $c$ of the main piston 25 must be slightly less than the sum of the distance $d$ along the surface of the main cylinder 12 between the casing shoulder 11 in the casing 10 and the outlet groove 21, and the width $e$ of the outlet groove 21. As a result of this relationship, when the valve is fully closed as shown in Fig. 1 the base 32 of the main piston 25 is located within the width $e$ of the outlet groove 21 so that a free passage is provided from the outlet through the annular space 34 to the drain 17 in the end plate 15. When fluid under pressure is introduced to the inlet 16 and sufficient force is applied to the crown of the pilot piston 26, the piston assembly 23 will move against the restraining influence of the spring 28. When the piston assembly has moved a distance equal to that by which the length $c$ of the main piston 25 is less than $d+e$, the base 32 of the main piston passes beyond the outlet groove 21, thereby cutting off access from the outlet 22 to the annular space 34 and the drain. This distance $d+e-c$ will merely be sufficient to permhit passage of the maximum drainage flow to be expected. With further movement of the piston the hypothetical line 37 on the pilot piston 26 will approach the plane of the casing shoulder 11; the piston assembly 23 will then have moved the distance $f$ from the hypothetical line 37 to the O-ring 27 at the piston shoulder 24. The dimension $f$ should be slightly less than the dimension $d$ so that when the piston has moved the distance $f$, which constitutes the length of the base portion of the pilot piston, and the hypothetical line 37 is level with the casing shoulder 11, the piston shoulder 24 will be slightly short of the outlet groove 21 as shown in Fig. 2. Furthermore, the sum of dimension $f$, and the distance $g$ along the surface of the main piston 25 from the piston groove 30 to the piston shoulder 24 should not be less than the sum of the dimensions $d$ and $e$. Consequently, when the hypothetical line 37 is level with the plane of the casing shoulder 11, the piston groove 30 has moved beyond the outlet groove 21 and is no longer conjoined therewith, so that the piston groove 30 constituting the common outlet for the oblique conduits 29 is sealed off from the outlet port 22 by the cylindrical wall of the main chamber.

With further movement of the piston, the hypothetical line 37 passes the casing shoulder 11 into the main cylinder 12, thereby allowing fluid to flow through the channels provided by the inclined planes 35 or through the equivalent channels into a receiving chamber in the main cylinder 12 between the plane of the casing shoulder 11 and the main piston 25, exposing the piston shoulder 24 to the pressure. The fluid is unable to escape from the receiving chamber through the oblique passages 29 because the piston groove 30 is now sealed off as explained previously, and since the dimension $d$ is greater than the dimension $f$, the piston shoulder 24 is at first still in advance of the outlet groove 21 so that the fluid does not escape through the outlet 22 to fill the system to which the valve discharges. The sudden exposure of the additional working surface against which the fluid can act causes a rapid increase in the force opposing the spring 28, with the result that further movement of the piston is correspondingly rapid.

Since $d$ is only slightly greater than $f$, the rapid movement of the piston causes the piston shoulder 24 immediately to move within the extent of the outlet groove 21 and the force of the fluid acting on the piston assembly carries the piston shoulder 24 beyond the outlet groove, thereby fully uncovering the outlet groove and allowing a full flow of fluid to take place through the valve; the movement of the piston is finally stopped by the engagement of the skirt 31 of the piston against the O-ring 33, which serves as a seal to prevent any leakage to the drain outlet 17 when the valve is open and the system is in operation. It is advisable that the distance $b$ should not be less than the sum of the dimensions $d$ and $e$ in order that the piston shoulder 24 will fully uncover the outlet groove 21; and the relationship $b=d+e$ should preferably be observed.

When the pressure in the system drops to a value at which it no longer provides sufficient force on the surfaces of the piston assembly to overcome the force of the spring 28, the piston assembly will move toward the closed position. Since $d$ is slightly greater than $f$, the piston shoulder 24 will pass over the outlet groove 21 and beyond the limit of the outlet groove before the hypothetical line 37 is level with the plane of the casing shoulder 11, and access to the outlet port 22 will temporarily be sealed off. Slight further movement of the piston brings the hypothetical line 37 level with the plane of the casing shoulder 11; at this point the fluid in the receiving chamber between the plane of the casing shoulder 11 and the main piston 25 is substantially trapped except insofar as slight leakage may take place past the main piston 25 into the outlet groove 21, and from the piston groove 30 as fed by the oblique passages 29 into the outlet groove 21. A slight further movement of the piston brings the piston groove 30 into conjoined relationship with the outlet groove 21 and the trapped fluid freely escapes through the oblique passages 29 into the outlet groove and the outlet 22. It will be seen that it is important that the oblique passages 29 opening into the piston groove 30 communicate with the outlet groove 21 at the instant that the hypothetical line 37 passes the plane of the casing shoulder 11, and this may be accomplished by arranging that $f+g=d+e$; it will be noted above that for opening purposes $f+g$ must not be less than $d+e$.

Since the inlet pressure is now applied only to the pilot piston 26, the force developed is far below the value sufficient to resist the spring 28, and the piston assembly rapidly moves toward the closed position. As the valve closes completely the base 32 of the main piston moves to within the extent of the outlet groove 21 so that the outlet port 22 is open to the drain port 17 through the annular space 34, and any fluid remaining in the outlet side of the system is allowed to drain out.

From the foregoing it will be understood that the closing of the annular port occurs at a lower pressure than that at which the port is opened because, in the opening operation, the pressure is allowed to build up in the inlet cylinder 13 until it can exert on the relatively small area of the piston 26, a force sufficient to depress the spring 28 by the distance $f$, whereas in the closing operation, the inlet pressure is applied to the whole area of the piston, including the piston shoulder 24 so that a much lower pressure will produce an equivalent piston force. It will also be noted that since the outlet port takes the form of a circumferential groove rather than the form of a simple circular port in the wall of the chamber, the variation of the flow as the piston shoulder 24 moves within the extent of the outlet groove 21 is extremely rapid in relation to the magnitude of movement of the piston. Thus it will be seen that the valve is so constructed that, as the hypothetical line 37 passes the casing shoulder 11, the valve snaps open or snaps shut, applying a sudden flow of fluid to the system or cutting off the flow positively at a predetermined pressure. Furthermore there is no risk of the valve jamming in operation due to malalignment of the piston or failure of the upper portion thereof to re-enter the inlet cylinder 13, since it cannot leave this chamber by virtue of its length in relation to its overall travel: the successful operation of the valve is chiefly dependent upon the good fit of the pilot piston 26 in the inlet cylinder 13, rather than upon the fit of the main piston 25 in the main cylinder 12, and the edges of the outlet groove 21 of the outlet port may be broken to provide a slight leakage into or out of the outlet groove without affecting the efficient functioning of the unit. Ideally, the relation $f+g=d+e$ previously referred to should be observed; if $f+g>d+e$ the opening qualities of the valve will be improved while the closing qualities will be impaired. However in the preferred example described herein it is considered desirable to establish the value $d+e$ as a minimum for the sum of the dimensions $f$ and $g$, relying upon some degree of leakage into the outlet groove 21 to prevent trapping of the fluid and thereby to insure satisfactory functioning during the closing operation.

Since the dimension $g$ will normally be equal to the dimension $d$ to provide complete communication between the outlet groove 21 and the oblique passages 29 opening into the piston groove 30 when the valve is fully closed, and since $f+g$ is preferably equal to $d+e$, then $f$ will in that case equal $e$; that is, the length of the base portion of the pilot piston 26 should preferably equal the width of the outlet groove 21. Further preferred dimensional relationships may be derived mathematically from the preferred equality of $f$ and $e$ and the preferred relationship $b=d+e$ previously referred to; it follows that each of $d$ and $g$ should preferably equal $b+(d-f)$. Furthermore, since $d$ is only slightly greater than $f$, $d$ and $g$ are only slightly greater than $b/2$; specifically if $\Delta$ is taken as the differential between $d$ and $f$, then $$d=g=\frac{b+\Delta}{2}$$

and $$e=f=\frac{b-\Delta}{2}$$

In an actual valve the following values for the significant dimensions have been found to be satisfactory:

| | |
|---|---|
| $a=0.60$ in. | $e=0.25$ in. |
| $b=0.55$ in. | $f=0.25$ in. |
| $c=0.45$ in. | $g=0.30$ in. |
| $d=0.30$ in. | $\Delta=0.05$ in. |

The dimensions figuring in the relationships described in the specification and claims are to be understood as meaning the effective or functional dimensions as applied to a symmetrical and regular arrangement and not necessarily the actual measurements in cases where the structure is in any respect anamorphous or irregular.

It will be understood that the construction herein shown and described is a preferred application of the invention, that in some instances for example, it may be unnecessary or undesirable to provide access from the outlet system to the drain or vent (though the end of the working cylinder remote from the inlet must normally be vented in accordance with recognized practice), that the aligning portion of the pilot piston may be eliminated in the embodiments of the invention illustrated in Figs. 1 to 4 without destroying the substantial advantages residing in the combination of the remaining elements of the invention, and that various changes in the shape, size and arrangement of the parts may be resorted to without departing from the spirit of the invention or the scope of the subjoined claims.

What we claim as our invention is:

1. A valve comprising, a hollow casing having inner walls defining a stepped chamber which includes a main cylinder and an inlet cylinder of lesser diameter than the main cylinder and provides a casing shoulder between the main cylinder and the inlet cylinder, a stepped piston assembly reciprocatable a predetermined distance in the chamber from open to closed positions and comprising a main piston slidable in the main cylinder and a pilot piston extending with a close sliding fit into the inlet cylinder in all positions of the piston assembly and providing a piston shoulder between the main piston and the pilot piston, the casing shoulder and the piston shoulder defining in the casing on reciprocation of the piston assembly a variable fluid receiving space, a flow channel between the inlet cylinder and the fluid receiving space, means urging the piston assembly toward the closed position, an inlet to the inlet cylinder for applying fluid pressure to the pilot piston and urging the piston assembly toward the open position, an outlet port in the circumferential wall of the main cylinder, a conduit outlet in the circumferential wall of the main piston, and a conduit extending from a conduit inlet in the piston shoulder to the conduit outlet; the pilot piston closing the flow channel to prevent flow into the fluid receiving space and the conduit outlet in the main piston being positioned to open into the outlet port, only when the piston assembly is in a position ranging inclusively from the closed position to a predetermined intermediate position; the fluid receiving space being sealed-off from the outlet port by the main piston when the piston assembly is in the said intermediate position and directly communicating with the outlet port after a predetermined increment in the movement of the piston assembly toward the open position from the said intermediate position.

2. A valve comprising, a hollow casing having inner walls defining a stepped chamber which includes a main cylinder and an inlet cylinder of lesser diameter than the main cylinder and provides a casing shoulder between the main cylinder and the inlet cylinder, a stepped piston assembly reciprocatable a predetermined distance in the chamber from open to closed positions and comprising a main piston slidable in the main cylinder and a pilot piston extending with a close sliding fit into the inlet cylinder in all positions of the piston assembly and providing a piston shoulder between the main piston and the pilot piston, the casing shoulder and the piston shoulder defining in the casing on reciprocation of the piston assembly a variable fluid receiving space, a flow channel extending through the casing from a channel inlet in the inlet cylinder to a channel outlet in the casing shoulder, means urging the piston assembly toward the closed position, an inlet to the inlet cylinder for applying fluid pressure to the pilot piston and urging the piston assembly toward the open position, an outlet port in the circumferential wall of the main cylinder, a conduit outlet in the circumferential wall of the main piston, and a conduit extending from a conduit inlet in the piston shoulder to the conduit outlet; the pilot piston closing the channel inlet in the inlet cylinder to prevent flow through the flow channel into the fluid receiving space and the conduit outlet in the main piston being positioned to open into the outlet port, only when the piston assembly is in a position ranging inclusively from the closed position to a predetermined intermediate position; the fluid receiving space being sealed-off from the outlet port by the main piston when the piston assembly is in the said intermediate position and directly communicating with the outlet port after a predetermined increment in the movement of the piston assembly toward the open position from the said intermediate position.

3. A valve comprising a hollow casing having inner walls defining a stepped chamber which includes a main cylinder and an inlet cylinder of lesser diameter than the main cylinder and provides an annular casing shoulder between the main cylinder and the inlet cylinder, a stepped piston assembly reciprocatable a predetermined distance in the chamber from open to closed positions and comprising a main piston slidable in the main cylinder and a pilot piston extending with a close sliding fit in all positions of the piston assembly into the inlet cylinder and providing an annular piston shoulder between the main piston and the pilot piston, the casing shoulder and the piston shoulder defining in the casing on reciprocation of the piston assembly a variable fluid receiving space, the pilot piston closing the inlet cylinder to prevent flow into the fluid receiving space only when the piston assembly is in a position ranging inclusively from the closed position to a predetermined intermediate position, means urging the piston assembly toward the closed position, an inlet to the inlet cylinder for applying fluid pressure to the pilot piston and urging the piston assembly toward the open position, an outlet port in the circumferential wall of the main cylinder, the minimum effective axial distance $d$ between the outlet port and the casing shoulder being greater by a predetermined increment than the distance of travel between the closed position and the said predetermined position of the piston assembly whereby the fluid receiving space is sealed off from the outlet port by the main piston when the piston assembly is in the said intermediate position and incorporates the outlet port after the piston assembly has moved from the said intermediate position toward the open position a further distance equal to the said increment, a conduit outlet in the circumferential wall of the main piston and registrable with the outlet port, a conduit through the main piston from a conduit inlet in the piston shoulder to the conduit outlet, the sum of the said distance of travel and the minimum effective axial distance g between the conduit outlet and the piston shoulder being not less than the sum of the distance d and the maximum effective dimension e of the outlet port in the direction of the longitudinal axis of the piston assembly, whereby the conduit outlet is positioned to open into the outlet port only when the piston assembly is in a position ranging inclusively from the closed position to a predetermined intermediate position.

4. A valve as claimed in claim 3 in which the sum of the said distance of travel and the said distance g is approximately equal to the sum of the distance d and the dimension e.

5. A valve as claimed in claim 3 in which the said predetermined distance of reciprocation is approximately equal to the sum of the distance d and the dimension e, the distance d is approximately equal to the distance g, and the sum of the said distance of travel and the distance g is approximately equal to the sum of the distance d and the dimension e.

6. A valve comprising, a hollow casing having inner walls defining a stepped chamber which includes a main cylinder and an inlet cylinder of lesser diameter than the main cylinder and provides a casing shoulder between the main cylinder and the inlet cylinder, a stepped piston assembly reciprocatable a predetermined distance in the chamber from open to closed positions and comprising a main piston slidable in the main cylinder and a pilot piston extendable into the inlet cylinder when the piston assembly is in the closed position and providing a piston shoulder between the main piston and the pilot piston, the casing shoulder and the piston shoulder defining in the casing on reciprocation of the piston assembly a variable fluid receiving space, means urging the piston assembly toward the closed position, an inlet to the inlet cylinder for applying fluid pressure to the pilot piston and urging the piston assembly toward the open position, an outlet port in the circumferential wall of the main cylinder, a conduit outlet in the circumferential wall of the main piston, and a conduit extending from a conduit inlet in the piston shoulder to the conduit outlet; the pilot piston closing the inlet cylinder to prevent flow into the fluid receiving space and the conduit outlet in the main piston being positioned to open into the outlet port, only when the piston assembly is in a position ranging inclusively from the closed position to a predetermined intermediate position; a drain port in the end of the main cylinder remote from the inlet cylinder, the drain port being in communication with the outlet port only when the piston assembly is between the closed position and the said intermediate position, the fluid receiving space being sealed-off from the outlet port by the main piston when the piston assembly is in the said intermediate position and directly communicating with the outlet port after a predetermined increment in the movement of the piston assembly toward the open position from the said intermediate position.

7. A valve comprising a hollow casing having inner walls defining a stepped chamber which includes a main cylinder and an inlet cylinder of lesser diameter than the main cylinder and provides a casing shoulder between the main cylinder and the inlet cylinder, a stepped piston assembly reciprocatable a predetermined distance in the chamber from open to closed positions and comprising a main piston slidable in the main cylinder and a pilot piston extendable into the inlet cylinder when the piston assembly is in the closed position and providing a piston shoulder between the main piston and the pilot piston, the casing shoulder and the piston shoulder defining in the casing on reciprocation of the piston assembly a variable fluid receiving space, means urging the piston assembly toward the closed position, an inlet to the inlet cylinder for applying fluid pressure to the pilot piston and urging the piston assembly toward the open position, an outlet port in the circumferential wall of the main cylinder, a conduit outlet in the circumferential wall of the main piston, and a conduit extending from a conduit inlet in the piston shoulder to the conduit outlet; the pilot piston closing the inlet cylinder to prevent flow into the fluid receiving space and the conduit outlet in the main piston being positioned to open into the outlet port, only when the piston assembly is in a position ranging inclusively from the closed position to a predetermined intermediate position; a drain port in the end wall of the main cylinder remote from the inlet cylinder, the piston assembly having a skirt extending axially from the end of the main piston facing the drain part, the skirt being spaced from the circumferential wall of the casing to provide an annular drainage space communicating with the drain port, the drainage space being in communication with the outlet port only when the piston assembly is between the closed position and the said intermediate position, the fluid receiving space being sealed off from the outlet port by the main piston when the piston assembly is in the said intermediate position and directly communicating with the outlet port after a predetermined increment in the movement of the piston assembly toward the open position from the said intermediate position.

8. A valve comprising, a hollow casing having inner walls defining a stepped chamber which includes a main cylinder and an inlet cylinder of lesser diameter than the main cylinder and provides an annular casing shoulder between the main cylinder and the inlet cylinder, a stepped piston assembly reciprocatable a predetermined distance in the chamber from open to closed positions and including a main piston slidable in the main cylinder, a hollow cylindrical skirt extending coaxially from one end of the main piston and sealingly engaging with an annular seating zone on the corresponding end wall of the main cylinder when the piston assembly is in the full open position, and a pilot piston extendable into the inlet cylinder when the piston assembly is in the closed position and providing a piston shoulder between the main piston and the pilot piston, the casing shoulder and the piston shoulder defining in the casing on reciprocation of the piston assembly a variable fluid receiving space, spring means within the hollow skirt urging the piston assembly toward the closed position, an inlet to the inlet cylinder for applying fluid pressure to the pilot piston and urging the piston assembly toward the open position, an outlet port in the circumferential wall of the main cylinder, a conduit outlet in the circumferential wall of the main piston, and a conduit extending from a conduit inlet in the piston shoulder to the conduit outlet; the pilot piston closing the inlet cylinder to prevent flow into the fluid receiving space and the conduit outlet in the main piston being positioned to open into the outlet port, only when the piston assembly is in a position ranging inclusively from the closed position to a predetermined intermediate position; a drain port in the end wall of the main cylinder facing the skirt and positioned within the annular seating zone of the skirt on the said end wall, the skirt being spaced from the circumferential wall of the casing to provide an annular drainage space communicating with the drain port around the adjacent end of the skirt when the piston assembly is not in the fully closed position, the drainage space being in communication with the outlet port only when the piston assembly is between the closed position and the said intermediate position, the fluid receiving space being sealed-off from the outlet port by the main piston when the piston assembly is in the said intermediate position and directly communicating with the outlet port after a predetermined increment in the movement of the piston assembly toward the open position from the said intermediate position.

KENNETH WILLIAM JAY.
ROLAND BOYD FERRIS.

References Cited in the file of this patent

UNITED STATES PATENTS

| Number | Name | Date |
|---|---|---|
| 671,770 | Locke | Apr. 9, 1901 |
| 1,257,070 | Discher | Feb. 19, 1918 |
| 2,201,363 | Campbell | May 21, 1940 |
| 2,234,932 | Schlaukitz | Mar. 11, 1941 |
| 2,594,626 | Earle | Apr. 29, 1952 |

FOREIGN PATENTS

| Number | Country | Date |
|---|---|---|
| 264,074 | Switzerland | Dec. 16, 1949 |